(12) United States Patent
Sethi

(10) Patent No.: US 8,671,030 B1
(45) Date of Patent: *Mar. 11, 2014

(54) ELECTRONIC VOUCHERS AND A SYSTEM AND METHOD FOR ISSUING THE SAME

(75) Inventor: Vincent Sethi, Southhampton (GB)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,337

(22) Filed: Aug. 27, 2012

Related U.S. Application Data

(63) Continuation of application No. 10/183,747, filed on Jun. 25, 2002, now Pat. No. 8,266,437.

(60) Provisional application No. 60/300,632, filed on Jun. 25, 2001.

(51) Int. Cl.
*H04L 9/32* (2006.01)
*G06F 7/04* (2006.01)

(52) U.S. Cl.
USPC ............. 705/27.1; 726/8; 726/9; 726/20; 713/176; 283/17; 283/904

(58) Field of Classification Search
None
See application file for complete search history.

(56) References Cited

U.S. PATENT DOCUMENTS

| | | | |
|---|---|---|---|
| 6,385,591 B1 * | 5/2002 | Mankoff | 705/14.26 |
| 7,065,212 B1 * | 6/2006 | Yu et al. | 380/205 |
| 7,281,272 B1 * | 10/2007 | Rubin et al. | 726/26 |
| 2001/0026616 A1 * | 10/2001 | Tanaka | 380/202 |
| 2002/0180997 A1 * | 12/2002 | Rozzi | 358/1.9 |

* cited by examiner

*Primary Examiner* — Cordelia Zecher
*Assistant Examiner* — Trang Doan
(74) *Attorney, Agent, or Firm* — Hunton & Williams LLP

(57) ABSTRACT

A system and method for issuing electronic vouchers representing value. An issuing server generates an eVoucher that a recipient may use to purchase goods and services from a merchant's e-commerce Web site. The eVoucher includes an image, such as a corporate logo, that identifies the issuing merchant. Nonimage data, such as a unique identifier for the eVoucher and encrypted arbitrary text, is embedded in the eVoucher image and is used to track the use of the eVoucher and to verify its authenticity.

15 Claims, 4 Drawing Sheets

ELECTRONIC VOUCHERS AND A SYSTEM AND METHOD FOR ISSUING THE SAME

CROSS REFERENCE TO RELATED APPLICATIONS

This application is a Continuation of U.S. patent application Ser. No. 10/183,747, filed Jun. 25, 2002, now U.S. Pat. No. 8,266,437, the disclosure of which is hereby incorporated by reference in its entirety.

FIELD OF THE INVENTION

This invention relates generally to electronic vouchers, and more specifically to electronic voucher images containing hidden data embedded in an image file, and a system and method for issuing such electronic vouchers.

BACKGROUND OF THE INVENTION

Vouchers, such as a discount coupons or gift certificates, are negotiable certificates, issued by a merchant, that represent credit against future purchases of the issuing merchant's goods or services. Paper-form and debit card vouchers have been well-known in the art for some time, and are commonly used forms of payment in face-to-face retail transactions. However, the increasing popularity among consumers of purchasing goods and services electronically over the Internet has created a need in the art for electronic vouchers that may be used in e-commerce transactions.

Although proprietary electronic voucher systems currently exist, such systems are very expensive to develop and maintain, and place the issuance of electronic vouchers beyond the reach of most small businesses. Moreover, existing electronic vouchers consist of nothing more than a simple number or keyword that a consumer is prompted to enter during an e-commerce transaction. A number or keyword cannot match the marketing and advertising power of a paper voucher or certificate, which typically displays a corporate logo or other imagery that identifies the issuing merchant. Finally, some known voucher systems force consumers to install proprietary software modules on their computers in order to operate, which may dissuade some consumers from utilizing the electronic vouchers.

Thus, there exists a need in the art for an electronic voucher system that may be implemented using software that is currently available to the consumer, that contains memorable imagery identifying the issuing merchant, and that may easily be implemented without incurring the expense of proprietary code development and maintenance.

SUMMARY OF THE INVENTION

In accordance with an exemplary embodiment of the present invention, a system and method is provided for issuing electronic vouchers representing value. An issuing server generates an eVoucher that a recipient may use to purchase goods and services from a merchant's e-commerce Web site. The eVoucher includes an image, which may be a corporate logo, or any memorable image, that identifies the issuing merchant. Nonimage data is embedded in the eVoucher image and is used to track the recipient's use of the eVoucher, and to verify its authenticity. In accordance with an exemplary embodiment of the present invention, the embedded nonimage data may include a serial number that uniquely identifies the eVoucher. The issuing server uses the serial number to track the value remaining in the eVoucher after each use, and to ensure that the eVoucher is not reused once its value is exhausted. The embedded nonimage data may also include arbitrary text known only to the user. Using public key encryption technology, the arbitrary text is encrypted using the issuing server's public key and embedded in the image. The issuing server stores a copy of the encrypted arbitrary text, and uses it to verify the authenticity of the electronic voucher image when the recipient submits the eVoucher to be redeemed by the merchant.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
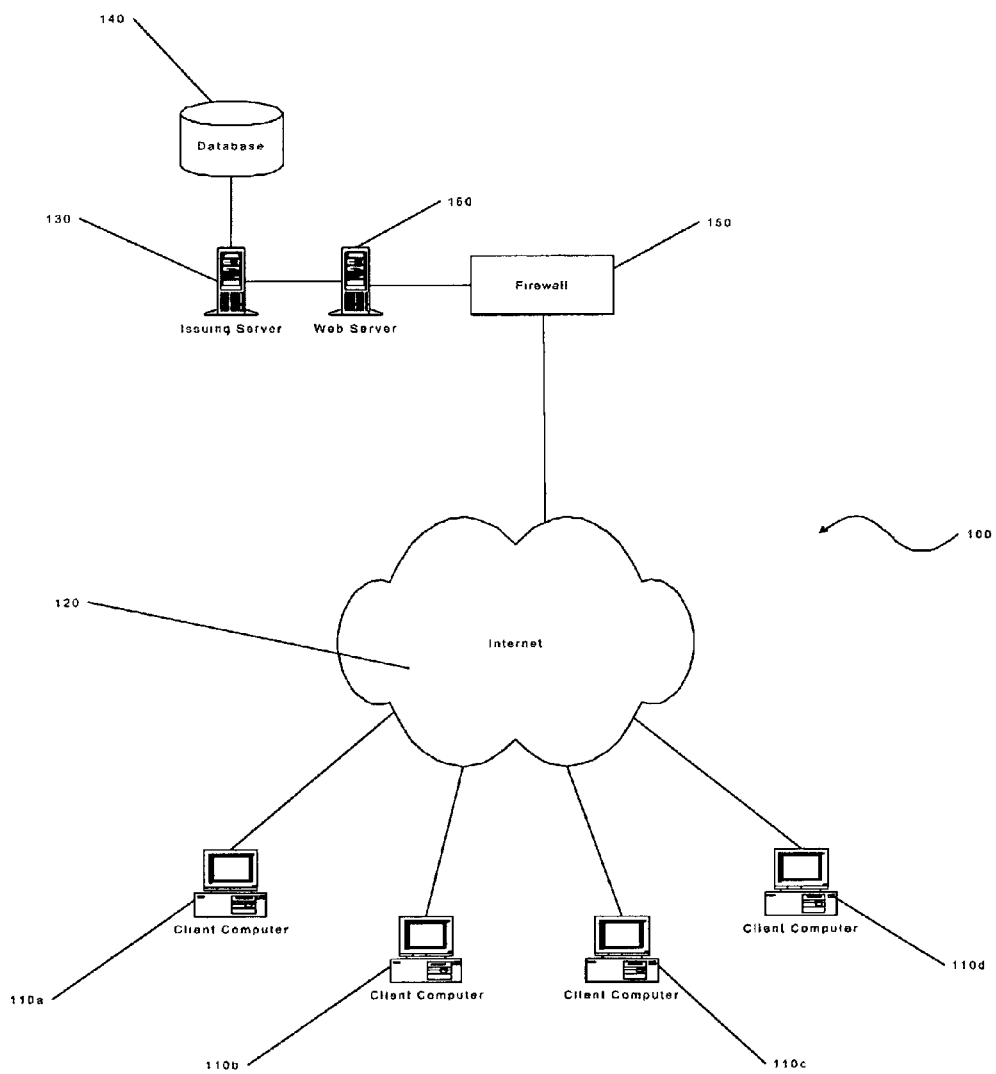
FIG. 1 is a diagram depicting a system for issuing electronic vouchers in accordance with an exemplary embodiment of the present invention.

FIG. 1 is a diagram depicting a system for issuing eVouchers in accordance with an exemplary embodiment of the present invention. Users may access the eVoucher system 100 by way of client computers 110a-d, each of which is preferably loaded with a conventional Web browser such as Microsoft Internet Explorer™. Each of the client computers 110a-d is connected to an issuing server 130, which is programmed to issue eVouchers as described in greater detail below, and a Web server 160 by way of a conventional data network 120 such as the Internet. Although in this exemplary embodiment the client computers 110a-d are preferably personal computers running Web browsers, in alternative embodiments a client computer 110a-d may be any device that can be connected to the Internet, including Personal Digital Assistants (PDAs), cellular telephones, interactive televisions, and other mobile communication devices.

The Web server 160 preferably runs a web site from which the merchant's eVouchers may be securely issued, in accordance with an exemplary embodiment of the present invention. Web server 160 also preferably runs a web site from which the merchant's products may be securely purchased, such as an e-commerce or Business to Consumer (B2C) web site. The issuing server 130 is programmed to dynamically generate pages to the Web server 160. The Web server 160 transmits these pages to the client computers 110a-d. The pages are preferably formatted using Hypertext Markup Language (HTML), Extensible Markup Language (XML), or any other variant capable of being displayed by a conventional Web browser running on the client computers 110a-d.

The issuing server 130 and the Web server 160 may reside on separate computers, as depicted in FIG. 1, or may alternatively exist as separate processes running on the same host computer. Although described in terms of an Internet based configuration, it will be appreciated by those skilled in the art that the system 100 of the present invention may operate entirely on a Local Area Network (LAN), a Wide Area Network (WAN), or through dial-up connections from the client computers 110*a-d* to, for example, the issuing server 130.

The issuing server 130 is preferably connected to a database 140. Database 140 is preferably a relational database, such as Microsoft SQL Server®. The issuing server 130 is programmed to query database 140, and to retrieve data from it as more fully described below.

Figure 2:
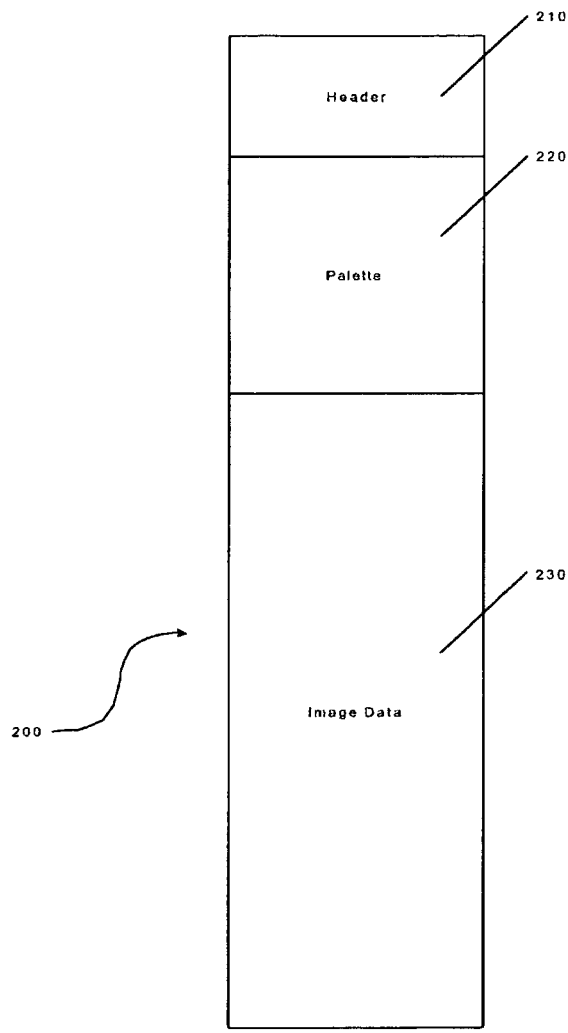
FIG. 2 is a diagram depicting a format for an eVoucher image in accordance with an exemplary embodiment of the present invention.

Before describing the operation of eVoucher system 100, the process by which information may be hidden in an eVoucher image file will be explained. Each eVoucher is an image file 200, the format of which is depicted in FIG. 2 in accordance with an exemplary embodiment of the present invention. The eVoucher image file 200 contains image data that defines an image such as, for example, a corporate logo or any image that identifies the merchant issuing the eVoucher. The eVoucher image file 200 also preferably includes image data that defines an image that depicts the value represented by the eVoucher. Image file 200 is preferably formatted using any standard image file format that employs lossless compression, such as, for example, the Microsoft Windows™ bitmap format (BMP) or the Graphics Interchange Format (GIF).

Generally, an image file indicates a color for each pixel along the horizontal axis or row, and a color for each pixel along the vertical axis or column of a computer graphics display. The eVoucher image file 200 preferably includes three parts: a header 210; a palette 220; and an array of image data 230.

The eVoucher image header 210 contains information describing the size of the eVoucher image, such as, for example, the number of bits allocated per pixel and the bit count. The eVoucher image data 230 is preferably greater than 8 bits per pixel (bpp), and includes data that defines the actual eVoucher image as well as palette index values used to define each pixel's color content. To determine the color of a pixel, the image data and an index into the eVoucher image palette 220 are extracted from the eVoucher image data 230. Although the image data 230 is preferably greater than 8 bpp, it will be appreciated by those of ordinary skill in the art that image data of less than 8 bpp may also be employed.

The color of each pixel in an eVoucher image file is preferably a blend of three color components: red, green and blue. Up to three bytes (one byte per color component) of data may be allocated in an image file to specify a pixel's color. A 24-bit color system (commonly known as a "true color" system), makes full use of all three bytes and is capable of displaying up to 16,777,216 colors. However, most color graphics display systems are 8-bit color systems, and display up to 256 colors.

Figure 3:
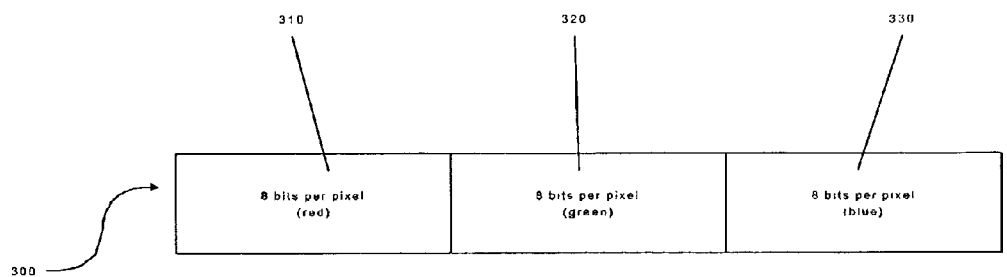
FIG. 3 is a diagram depicting a 24-bit eVoucher image pixel in accordance with an exemplary embodiment of the present invention.

Reducing the number of bits per pixel of image data 230 used to define an eVoucher image 200 results in a fewer number of colors available for use in rendering the image. But such a reduction will not otherwise affect the rendering of the image. As a result, it is possible to reduce the number of bits per pixel of image data 230 used in an eVoucher image 200 without compromising the quality of the image, and to use the unused to store nonimage data within the image file. As an example, consider the 24-bit eVoucher image pixel depicted in FIG. 3, in accordance with an exemplary embodiment of the present invention. Since each of the pixel's three bytes are being fully utilized to represent red, green and blue respectively, the eVoucher image 300 is capable of displaying up to 16,777,216 colors.

Figure 4:
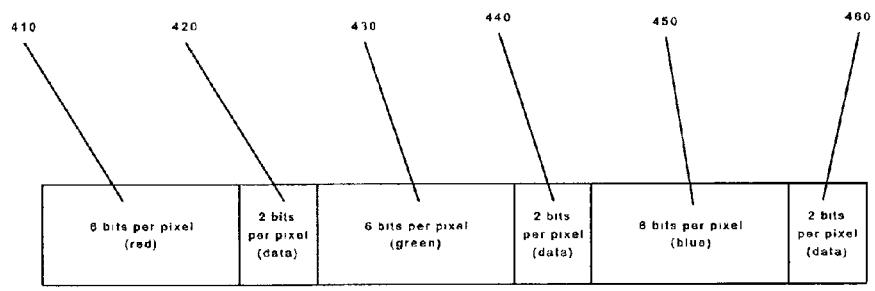
FIG. 4 is a diagram depicting an eVoucher image pixel with embedded nonimage data in accordance with an exemplary embodiment of the present invention.

As depicted in FIG. 4, however, by emptying the two least significant bits in each byte of the 24 bpp image data 300, up to 6 bits of nonimage data may be stored, per pixel. Although the eVoucher image color resolution is reduced from 24 bpp to 18 bpp (i.e., from 16,777,216 colors to approximately 65,536 colors) this will have a negligible effect, if any, on the quality of the eVoucher image. Most graphics systems are only capable of displaying 256 colors.

Nonimage data may alternatively be stored in the eVoucher image data by expanding its original number of bits per pixel to an arbitrary number of additional bits per pixel. Since the added bits are irrelevant in determining pixel color, nonimage data hidden in those bits will have no effect on how the eVoucher image is rendered and displayed.

The operation of the eVoucher system in accordance with an exemplary embodiment of the present invention will now be described with reference to FIGS. 1 and 5. The process begins at step 510, when a purchaser, such as an individual person or a company, contacts an issuer to order an eVoucher. The issuer may be the merchant who will be honoring the eVoucher or, alternatively, may be a trusted third-party that is contracted to generate and issue eVouchers on behalf of the merchant.

The issuer preferably has the issuing server 130, as illustrated in FIG. 1. The issuing server 130 is connected to a Web server 160 that runs an eVoucher issuing Web site. The purchaser may thus, via the Web server 160, order an eVoucher over a secure Internet connection between the issuing server 130 and a Web browser running on the purchaser's client computer 110*a-d*. When ordering the eVoucher, the purchaser is preferably prompted to enter: an e-mail address for the ultimate recipient of the voucher; a message to the recipient; and the desired value of the eVoucher. To purchase the eVoucher, the purchaser may enter, for example, credit card information, although any conventional form of payment may be used. The issuing server may then store the order information entered by the purchaser in database 140.

At step 520, the issuing server 130 generates an eVoucher that includes an eVoucher image file 200. As was stated previously, the eVoucher image file 200 may be an image of a corporate logo or any other image that identifies the honoring merchant. To ensure that each issued eVoucher is only used once, the issuing server 130 assigns a unique serial number to each eVoucher it generates. The serial number may be encrypted, using conventional encryption techniques, and embedded in the nonimage data bits of the eVoucher image file, using the process previously described in connection with FIG. 2 through 4.

The serial number may be stored in database 140, and an eVoucher account may be established for the recipient, using the serial number as a unique identifier for the account. Thus, the eVoucher system of the present invention may keep a record, not only of whether the eVoucher has been used, but how much value remains on the eVoucher each time it is used by the recipient.

Preferably, once the eVoucher has been used, the serial number assigned to that eVoucher is never be used again. The process for assigning these unique serial numbers may be carried out by using a conventional Globally Unique Identifiers (GUIDS) algorithm, as those of ordinary skill in the art will readily appreciate. Alternatively, the serial number generation scheme may be accomplished using a simple linear count, in which each eVoucher's serial number is one increment higher than the serial number of the last issued eVoucher.

Since more than one person may have access to the recipient's email address, the eVoucher system of the present invention includes a security mechanism to ensure that only the recipient, and no other entity, is able to redeem the eVoucher. This security mechanism is based on conventional public key encryption, which is fully described in U.S. Pat. No. 4,405,829, and is well-known to those of ordinary skill in the art. Although the security mechanism is described in terms of the recipient being someone other than the purchaser of the eVoucher, in alternative embodiments the purchaser and the recipient may be the same. In this embodiment, the recipient's identity need not be included in the eVoucher. Thus, for example, a purchaser might buy an eVoucher and have it delivered to himself as the recipient. The purchaser would then be free to redeem the eVoucher himself, or send the eVoucher to yet another person, for example, as a gift.

To implement the security mechanism, at step 530, the issuer sends the recipient an email containing an executable program and the issuer's public key. The executable program is preferably a Java applet which, as will be appreciated by those of ordinary skill in the art, runs in its own secure memory space, and does not require that the software be installed on the recipient's client computer 110a-d. Alternatively, however, any executable software program may be utilized.

The Java applet then prompts the recipient to enter some arbitrary text. The text is preferably some piece of information that the recipient will easily remember, such as the recipient's mother's maiden name, and may be used to verify the identity of the recipient. In an alternative embodiment, the purchaser and the recipient may be the same and the recipient may wish to send the eVoucher to yet another person, for example, as a gift. The purchaser/recipient would also pass the arbitrary text on to the ultimate recipient, for the same purposes described above. The Java applet then, at step 540, encrypts the arbitrary text using the issuer's public key and transmits it back to the issuing server 130.

At step 550, the issuing server 130 signs the encrypted text using the issuer's private key, and stores the encrypted signed text in database 140. The issuing server 130 also, at step 550, embeds the encrypted signed text in the eVoucher image file 200. At step 560, the issuer then encrypts the eVoucher using the issuer's private key, and emails the eVoucher to the recipient. It is important to note that since the text entered by the recipient was encrypted using the issuer's public key, only the issuer (using the private key) can decrypt it. Since only the issuer has the issuer's private key, no one, not even the recipient, should be able to decrypt the text embedded in the eVoucher image in order to alter it. As a result, when the recipient attempts to redeem the eVoucher, the issuer and/or the merchant will be able to compare the encrypted text embedded in the eVoucher image with the encrypted text stored in database 140 to verify that the eVoucher being redeemed is the same eVoucher that was sent to the recipient.

Figure 5:
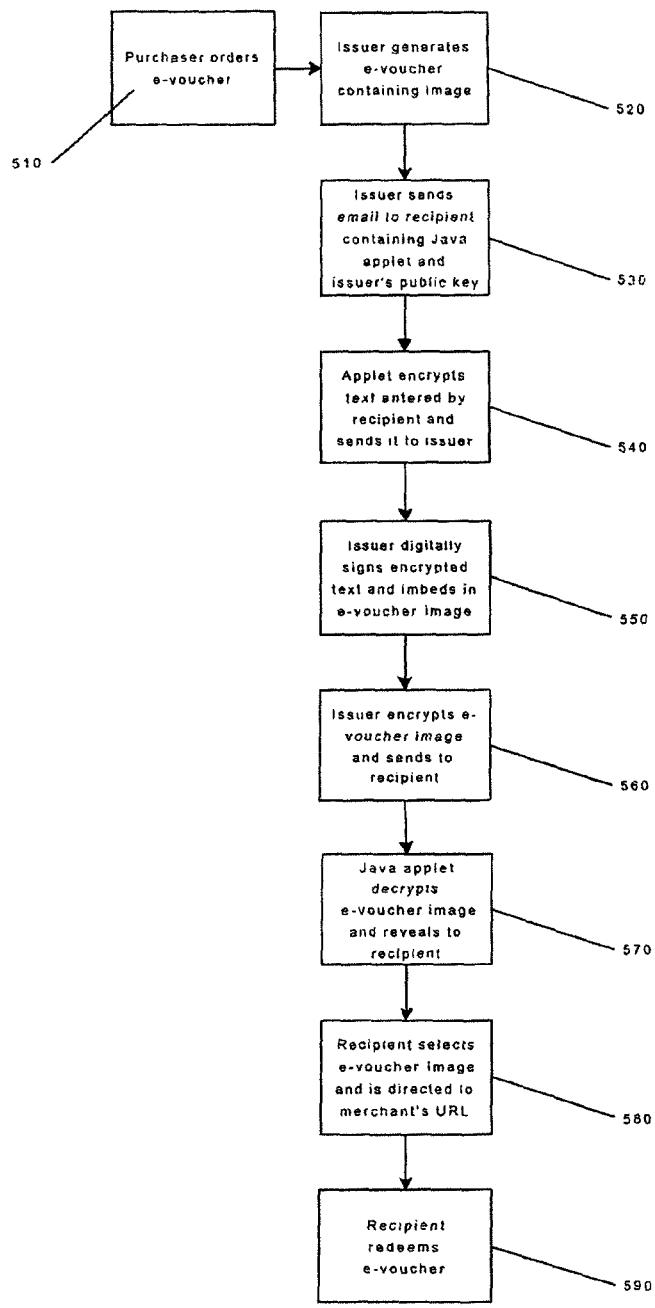
FIG. 5 is a flowchart depicting a method for issuing eVouchers in accordance with an exemplary embodiment of the present invention.

At this point in the process depicted in FIG. 5, the eVoucher and the recipient are deemed trusted by the issuing entity and, as a result, by the merchant as well. To redeem the eVoucher, the recipient preferably, at step 570, opens the email containing the eVoucher sent by the recipient. The Java applet, at step 570, decrypts the eVoucher using the issuer's public key and reveals a valid eVoucher to the recipient. When the recipient clicks at step 580, the eVoucher image, a connection is preferably automatically established to the honoring merchant's e-commerce server, at which the recipient may select a product or service and purchase it using the eVoucher at step 590.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A method for authorizing an transaction comprising:
   receiving, at a first party, a request to conduct a transaction from a second Party;
   receiving, at the first party, an electronic image file comprising image data and nonimage data, the image data comprising a plurality of bits that define an image and the nonimage data comprising a plurality of bits that do not define the image, wherein altering the nonimage data has no effect on the appearance of the image;
   using a processor, verifying an identity of the second party based on the nonimage data; and
   using the computer processor, authorizing the transaction.

2. The method of claim 1, wherein the first party is a merchant and the second party is a purchaser of a good or service.

3. The method of claim 1, wherein the nonimage data uniquely identifies the second party.

4. The method of claim 1, wherein the nonimage data uniquely identifies a financial account.

5. The method of claim 1, wherein the nonimage data defines a hyperlink to a Web server.

6. The method of claim 1, wherein the hyperlink is to the first party's Web server.

7. The method of claim 1, wherein the nonimage data is encrypted.

8. The method of claim 1, wherein the transaction is a financial transaction.

9. A method for authorizing an transaction comprising:
   receiving, at a merchant, a request to conduct a transaction from a second party, the transaction being for a purchase of a good or service;
   receiving, at the merchant, an electronic image file comprising image data and nonimage data, the image data comprising a plurality of bits that define an image and the nonimage data comprising a plurality of bits that do not define the image, the image data identifying an account, wherein altering the nonimage data has no effect on the appearance of the image;
   using a processor, verifying that the account has sufficient funds for the purchase of the goods or service; and
   using the computer processor, authorizing the transaction.

10. The method of claim 9, wherein the nonimage data further defines a hyperlink to a Web server.

11. The method of claim 10, wherein the hyperlink is to the merchant's Web server.

12. The method of claim 10, wherein the nonimage data is encrypted.

13. A method of conducting an online transaction comprising:
   receiving, at a merchant computer, an order from a purchaser computer indicating one or more goods and/or services the purchaser intends to purchase;
   receiving, at the merchant computer, an electronic image file comprising image data and nonimage data, the image data comprising a plurality of bits that define an image and the nonimage data comprising a plurality of bits that do not define the image in said image file, the nonimage data uniquely identifying a recipient, wherein altering the nonimage data has no effect on the appearance of the image;
   using a computer processor, verifying an identity of the recipient based on the nonimage data; and
   using the computer processor, authorizing the transaction.

14. A method for providing a recipient with an image file that is used to identify the recipient, comprising:
- at least one computer processor generating an image file including image data, the image data comprising a plurality of bits that define an image;
- the at least one computer processor embedding nonimage data comprising a plurality of bits that do not define the image in said image file, the nonimage data uniquely identifying a recipient, wherein the nonimage data has no effect on the appearance of the image; and
- transmitting the image file to a recipient.

15. An image embodied on a non-transitory computer readable medium comprising:
- electronic image data defining an image; and
- nonimage data embedded in the electronic image data that uniquely identifies the image, wherein altering the nonimage data has no effect on the appearance of the image;
- wherein the electronic image data comprises a plurality of bits that define the image and a plurality of bits that do not define the image, and wherein the plurality of bits that do not define the image comprise the nonimage data; and
- wherein the nonimage data, when processed by a computer processor, verifies that the image is authentic.

* * * * *